(No Model.)
D. G. AUCHEY.
HORSE HAY RAKE.
No. 254,787. Patented Mar. 14, 1882.
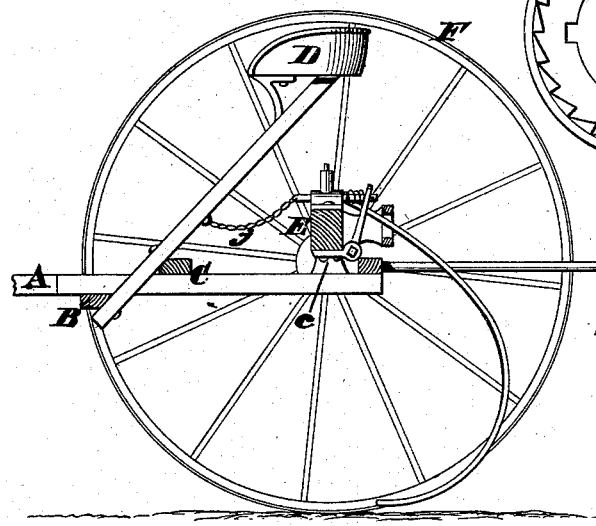
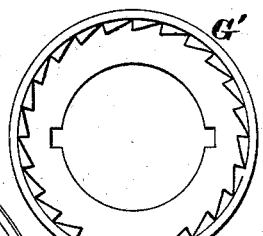
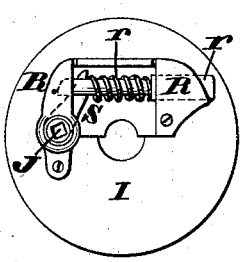
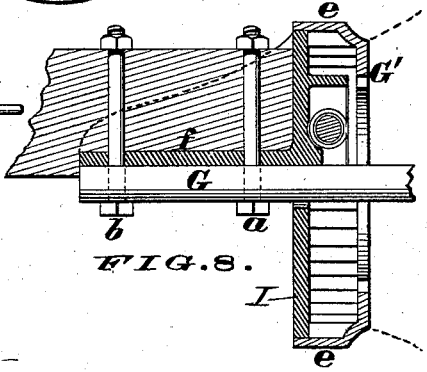
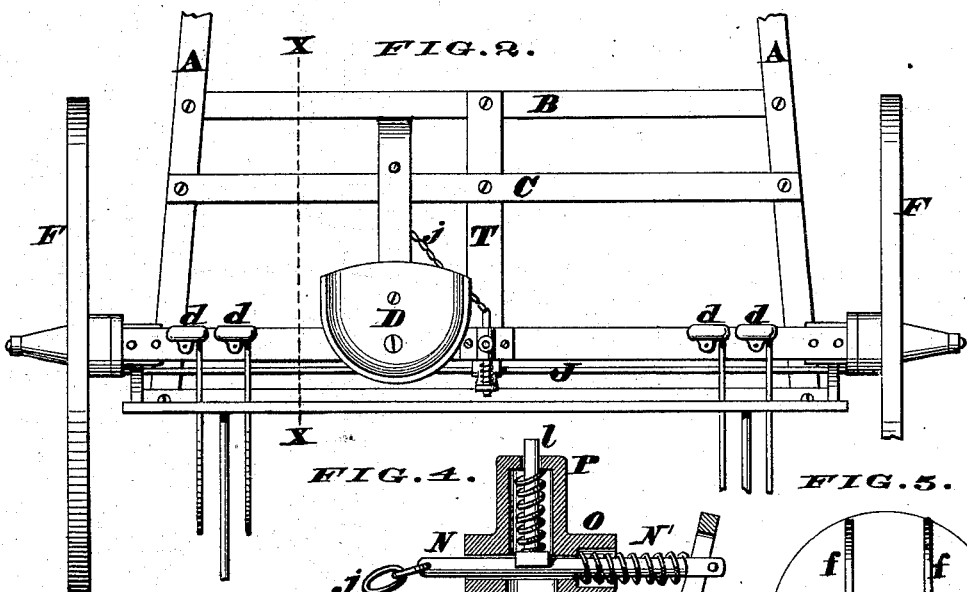
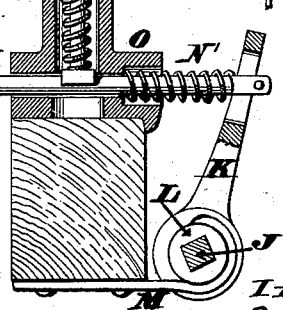
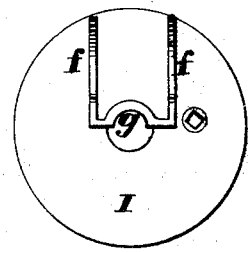
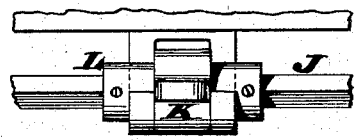
Attest.
Inventor.
David G. Auchey
by Stein & Peck Attys

UNITED STATES PATENT OFFICE.

DAVID G. AUCHEY, OF DAYTON, OHIO, ASSIGNOR TO B. C. TAYLOR, OF SAME PLACE.

HORSE HAY-RAKE.

SPECIFICATION forming part of Letters Patent No. 254,787, dated March 14, 1882.

Application filed September 21, 1881. (No model.)

*To all whom it may concern:*

Be it known that I, DAVID G. AUCHEY, of Dayton, Montgomery county, Ohio, have invented certain new and useful Improvements in Horse Hay-Rakes, of which the following is a full, clear, and exact description.

My invention relates to certain improvements in horse hay-rakes of that class known as "self-dumping" rakes, in which the traction of the machine causes the elevation of the teeth at the will of the operator and the automatic resetting of the same.

The novelty consists in the construction and arrangement of the parts, all as will be herewith set forth and specifically claimed.

In the accompanying drawings, Figure 1 is a side elevation of my improved rake in section through the line $x\ x$ of Fig. 2. Fig. 2 is a plan view of the rake. Fig. 3 is an enlarged detail view of the oscillating rod, locking-lever, and its bearing. Fig. 4 is an enlarged sectional view through the rake-head, in cross-section at its middle, showing the locking-lever and its actuating-bolt. Fig. 5 is an enlarged inside view of the end bearing-plate. Fig. 6 is an enlarged inside view of the ratchet-casing. Fig. 7 is an outside view of Fig. 5, showing the dog and its actuating mechanism. Fig. 8 is an enlarged longitudinal sectional view through the hub and locking mechanism at the end of the rake-head.

The same letters of reference refer to like parts in all the figures.

The frame-work of the rake, consisting of the thills A, cross-bars B C, seat D, rake-head E, and wheels F, is of the usual construction and united in the customary or any suitable way. The wheels F run on spindles G, bolted to the under side of the rake-head, as seen at $a\ b$ in Fig. 8; and the rake is hinged, so as to tilt to cause the elevation of the teeth upon the thills at $c$ in line with the wheel-spindles, as seen in Fig. 1. The teeth are similar to those generally employed in this class of machines, and are connected by any suitable fastenings to the rake-head, as at $d$, Fig. 2, where, however, only a few teeth are shown and not the whole set.

To cause the automatic or mechanical dumping of the machine, I provide V-shaped ratchets in the inner periphery of the metal casings G', as shown in Fig. 6, and projecting from the casings and completing the same are annular flanges $e$, Fig. 8, which inclose the ratchet.

To inclose the ratchet-casings G', I secure to each end of the rake-head a bearing-plate, I, circular in form, as seen in Figs. 5 and 7, and which forms a cover for the ratchet-openings by resting against and within the flange $e$, as shown in Fig. 8. These plates, which have a flanged socket, resting upon the bottom and sides of the rake-head, are bolted thereto by the same bolts which unite the wheel-spindles to the rake-head, and the spindles pass through central apertures in the end plates, as seen in Fig. 8, and rest in a recess or groove, $g$, in the under side of the sockets, as shown in Fig. 5.

Upon the lower rear side of the rake-head is a rod, J, preferably square in cross-section, whose ends pass through apertures in the plates I and project into the ratchet-casings. This rod has upon it, at the middle of the rake-head, a lever, K, supported by a sleeve, L, encompassing the rod and united to the rake-head by a forked bearing-plate, M, bolted to the under side of the rake-head, as seen in Fig. 4.

The upper end of the lever K is slotted, and through this slot is passed a bolt, N, supported in and guarded by a cap bearing-plate, O, which covers it and which is bolted to the rake-head. Surrounding the rear portion of the bolt N, between the bearing-plate O and arm K, is a spiral spring, N'. When the bolt N is drawn forward this spring is compressed; but when said bolt is caused to move backward by reason of its forward end striking the rake-frame the said spring is relieved of compression and operates quickly, but without shock, to throw back the lever K. The front end of the bolt N is united to the seat-beam or any suitable treadle by a chain, $j$, or any suitable link, so that by pressing upon the chain or treadle with the foot causes the bolt to slide forward and effects the oscillation of the rod J.

The cap-piece O has a housing, P, upon it, in which is a spring-projected bolt, $l$, whose lower end rests upon the bolt N and engages with said bolt to hold it, though not rigidly, in one of two positions, as will be hereinafter explained.

Upon the outer sides of the plates I, and forming part thereof, are bearings R, Fig. 7, in which are confined spring-projected dogs $r$, whose noses are adapted to engage with the ratchets in the wheel-hubs, and whose rear ends are slotted to receive the upper ends of crank arms or levers $s$, keyed or fitted upon the ends of the oscillating rod J, as shown in Fig. 7.

From the above construction it will be readily understood that by oscillating the rod J through the medium of the bolt N and chain $j$ the dogs will be simultaneously thrown into engagement with the ratchets, and a lock will be effected between the carriage-wheels and the rake-head, which, as the machine advances or turns, causes the tilting of the rake-head and the elevation of the teeth to discharge the collected loads. The springs upon the dogs permit of their slipping back should the rake be backed after a lock has been effected. When the bolt N is drawn forward the spring-bolt $l$ operates to assist in holding it in that position until the end of said bolt N strikes the cross-beam T of the frame or a vertically-adjustable tripping-plate thereon, such as is employed in ordinary self-dump rakes. Upon such striking of the bolt N said bolt is forced backward, thus causing the spring N' to overcome the pressure of the spring-bolt $l$ and to press backward the arm K, tilt the rod J, and release the locking-dogs from the wheel-ratchets. The spring-bolt $l$ holds the bolt N in its backward position when the machine is raking.

I claim as my invention—

1. In a horse hay-rake, the combination of the ratchets revolving with the carriage-wheels, the oscillating rod on the rake-head, the arms on the ends of said rods, and the sliding dogs with the central lever mounted on the oscillating rod, the sliding bolt projecting through the central lever, and the spring on said bolt operating to throw back the lever when the bolt is pushed back.

2. In a horse hay-rake, the combination of the oscillating rod on the rake-head, the central lever mounted on said oscillating rod, the sliding bolt projecting through the central lever, the spring on said bolt operating to throw back the lever when the bolt is pushed back, and the spring-bolt bearing on the sliding operating-bolt with frictional contact and serving to assist in holding it in adjusted position, substantially as described.

3. The combination, with the ratchets on the wheel-hubs, of the bearing-plates J, secured to the ends of the rake-head and having the bearings R R, the spring-bolts $r$, sliding longitudinally in said bearings, the oscillating rod, and the crank-arms on the ends of said rod, substantially as described.

In testimony whereof I hereunto set my hand.

DAVID G. AUCHEY.

Witnesses:
GEO. R. YOUNG,
CHAS. M. PECK.